United States Patent [19]
Khan et al.

[11] Patent Number: 5,677,609
[45] Date of Patent: Oct. 14, 1997

[54] INTELLIGENT SERVOMECHANISM CONTROLLER

[75] Inventors: Emdadur Rahman Khan, San Jose; Varkey Paul Alapat, Sunnyvale, both of Calif.

[73] Assignee: National Semiconductor Corporation, Santa Clara, Calif.

[21] Appl. No.: 282,082

[22] Filed: Jul. 28, 1994

(Under 37 CFR 1.47)

[51] Int. Cl.[6] .................................................. G06F 15/18
[52] U.S. Cl. ......................... 318/561; 318/274; 395/11; 360/75
[58] Field of Search ........................ 318/560, 561, 318/568.13, 632, 273, 274; 395/11, 21; 364/148–151, 474, 15; 360/75, 77.01, 77.04

[56] References Cited

U.S. PATENT DOCUMENTS

| | | | |
|---|---|---|---|
| 4,638,230 | 1/1987 | Lee | 318/632 |
| 5,168,549 | 12/1992 | Takagi et al. | 395/3 |
| 5,349,646 | 9/1994 | Furuta et al. | 395/22 |
| 5,448,681 | 9/1995 | Khan | 395/11 |
| 5,471,381 | 11/1995 | Khan | 364/148 |
| 5,475,663 | 12/1995 | Ogino | 369/44.28 |

FOREIGN PATENT DOCUMENTS

| | | |
|---|---|---|
| 2-260002 | 10/1990 | Japan . |
| 2-292602 | 12/1990 | Japan . |
| 3-268077 | 11/1991 | Japan . |
| 3-291729 | 12/1991 | Japan . |
| 4-77828 | 3/1992 | Japan . |
| 4-92901 | 3/1992 | Japan . |
| 4-170641 | 6/1992 | Japan . |
| 4-186402 | 7/1992 | Japan . |
| 4-205163 | 7/1992 | Japan . |

OTHER PUBLICATIONS

Keller, et al., "Fuzzy Logic Inference Neural Networks", SPIE, vol. 1192, pp. 582–591, Intelligent Robots and Computer Vision VIII: Algorithms and Techniques, 1989.

Cox, Earl, "Integrating Fuzzy Logic into Neural Nets", AI Expert, Jun. 1992, pp. 43–47.

Cela, et al., "Towards A Neural Fuzzy Controller", IEEE, Systems, Man, and Cybernetics, 1992 International, pp. 1277–1282.

Horikawa, et al., "On Fuzzy Modeling Using Fuzzy Neural Networks with the Back-Propagation Algorithm", IEEE, Transactions on Neural Networks, vol. 3, No. 5 Sep. 1992, pp. 801–806.

(List continued on next page.)

*Primary Examiner*—Brian Sircus
*Attorney, Agent, or Firm*—Limbach & Limbach L.L.P.

[57] ABSTRACT

A servomechanism controller for controlling the movement and positioning of a servomechanism (such as that of an actuator assembly for the read/write heads of a hard disk drive assembly) in accordance with an improved "bang-bang" seek technique includes at least one neural network. In one embodiment, a single neural network, connected to a plant with servomechanism, receives two input positioning signals and provides an output positioning signal. One input positioning signal represents a desired servomechanism position, while the other represents its present position. The output positioning signal represents a positioning time period within which the servomechanism will reach the desired position plus a deceleration time period within the positioning time period upon the termination of which the servomechanism will reach its desired position. In another embodiment, one neural network, connected to the plant, receives an input positioning signal and provides an output positioning signal and a status signal. The input positioning signal represents a desired servomechanism position. The output positioning signal represents a positioning time period within which the servomechanism will reach its desired position. The status signal represents a control status of the neural network. Another neural network, also connected to the plant, receives the status signal plus a feedback signal and provides a correction signal. The feedback signal represents the present servomechanism position, while the correction signal represents a deceleration time period within the positioning time period upon the termination of which the servomechanism reaches its desired position.

14 Claims, 7 Drawing Sheets

OTHER PUBLICATIONS

Sun, et al., "Fuzzy Modeling Based On Generalized Neural Networks And Fuzzy Clustering Objective Functions", IEEE, Proceedings of the 30th Conference on Decision and Control, Dec. 1991, Brighton, England, pp. 2924–2929.

Kawamura, et al., "A Prototype of Neuro–Fuzzy Cooperation System", IEEE International Conference On Fuzzy Systems, Mar. 8–12, 1992, San Diego, CA pp. 1275–1282.

Buckley, et al., "On the Equivalence of Neural Networks and Fuzzy Expert Systems", IEEE, 1992, pp. II–691 –II–695.

Rumelhart, et al., "Learning Internal Representations by Error Propagation", Chapter 41, pp. 675–682, 1986.

Nie, et al., "Fuzzy Reasoning Implemented by Neural Networks", IEEE, pp. II–702 –II–707, 1992.

Berenji, Hamid R., "Refinement of Approximate Reasoning–based Controllers by Reinforcement Learning", Machine Learning: Proceedings of the Eighth International Workshop, Evanston, Illinois, Jun. 27–29, 1991 (5 pages).

INTELLIGENT SERVOMECHANISM CONTROLLER

BACKGROUND OF THE INVENTION

1. Field of the Invention

The present invention relates to disk drive servomechanism controllers, and in particular, to disk drive servomechanism controllers using switched velocity profiles for the control signals driving the servomechanism.

2. Description of the Related Art

An important parameter for any computer memory device is the data transfer rate, i.e. the rate at which data can be stored and/or retrieved from the memory device. With the ever-increasing processing speed of today's computers, increasing the data transfer rate becomes increasingly desirable. A key factor which limits the data transfer rate is access time. Access time is particularly critical when the subject computer data storage device is a disk drive. In a disk drive, the access time is typically affected most by the electromechanical characteristics of the actuator servomechanism assembly due to its dependence upon the time needed for the read/write head to move from its present, or starting, track to the desired, or target, track.

Referring to FIG. 1, a typical disk drive will have a servo controller 10 which drives an actuator servomechanism assembly 12. The servomechanism 12, via a coupling arm or actuator 14, moves a transducer assembly 16 across the surface of a magnetic disk 18 from one concentrically disposed track to another between the center 20 and periphery 22 of the disk 18. In a conventional disk drive, one proposed technique for achieving minimum access time, i.e. the minimum time needed to move the transducer assembly 16 from one track position to another on the disk 18, is commonly referred to as a "bang-bang" technique.

Referring to FIG. 2, the "bang-bang" drive technique uses full acceleration from the point of origin 0 for the transducer assembly 16 until a midpoint X of the total travel distance (i.e. between the initial and final track positions) is reached. At that point X, full deceleration is then used such that the transducer assembly 16 reaches zero velocity upon reaching the target position T.

However, the bang-bang technique does have a number of problems, due primarily to the fact that the midpoint switching, i.e. the position X at which the switch from acceleration to deceleration is made, is not very accurate. This inaccuracy is cause primarily by the variability of the effective moving force on the transducer assembly 16 which varies as a function of its radial position, velocity and direction of movement. Other contributing factors are the time-variant performance characteristics of the actuator servomechanism assembly 12. Moreover, as the sizes (e.g. geometries) of the overall disk drive and its subassemblies become smaller, performance repeatability and consistency becomes increasingly important and problematic. Hence, while potentially effective, use of the bang-bang technique has been limited.

Referring to FIG. 3, an alternative driving technique is referred to as the "velocity profile method". As shown, this technique uses full acceleration for a period of time between the point of origin O and a switching point X. At this point X, deceleration begins along a predetermined velocity profile to a transition point Y which is in the vicinity of the desired disk track and from which the target track T is approached. The switching point X occurs when the velocity during acceleration intersects a velocity value on the predetermined velocity profile. The predetermined velocity profile is then followed to account, i.e. correct, for: (1) inaccuracies in the state estimation, control input prediction and execution steps of the acceleration-to-deceleration switching point X; (2) variations between disk drive units due to assembly and component variations; and (3) the necessity to reach the vicinity of the target track with the correct velocity.

However, the velocity profile method involves closed loop control for determining the acceleration-to-deceleration switching point X and for following the desired velocity profile during deceleration. Information representing the position of the transducer assembly 16 is fed back to the servo controller 10 (FIG. 1) at a fixed sampling rate, from which the other state variables such as position, velocity, acceleration, and/or "jerk" can be calculated. This need to read position data from the disk 18 surface, compute the requisite parameters and predict/adjust the control output at the sampling rate throughout deceleration results in a heavy computational burden on the controller 10.

Other techniques include PID (Proportional, Integral and Derivative) loop control and MRAC (Model Reference Adaptive Control). A PID technique uses a simple linear function of selectively proportioned, or scaled, integrals and derivatives of the servomechanism output for generating the control signals. Although this technique provides adequate performance for many simple control applications, it is not suitable for highly nonlinear and time-variant, high performance systems such as disk drive servomechanisms.

The MRAC technique uses a model which exhibits the desired output characteristics. This model is used to develop adaptive rules so that after learning is completed, the system behaves like the model. However, this technique requires an accurate model of the servomechanism. Such models are difficult to create for highly nonlinear and time-variant, high performance systems such as hard disk drive servomechanisms. Moreover, this technique tends to be computation intensive.

Accordingly, it would be desirable to have an improved servomechanism controller which would control a disk drive servomechanism with a simplicity approaching that of the bang-bang technique and the accuracy approaching that of the velocity profile method.

SUMMARY OF THE INVENTION

A servomechanism controller in accordance with one embodiment of the present invention is for controlling the movement and positioning of a servomechanism substantially in accordance with a modified bang-bang seek technique, and includes a neural network for coupling to a plant which includes a servomechanism. The neural network is for receiving at least two input positioning signals and in accordance therewith providing an output positioning signal. One input positioning signal includes information corresponding to a desired position of the servomechanism, while another input positioning signal includes information corresponding to a present position of the servomechanism. The output positioning signal includes information corresponding to a positioning time period within which the servomechanism is to attain the desired position, plus information corresponding to a deceleration time period within the positioning time period upon the termination of which the servomechanism attains the desired position.

A servomechanism controller in accordance with another embodiment of the present invention is also for controlling the movement and positioning of a servomechanism substantially in accordance with a modified bang-bang seek technique, and includes two neural networks for coupling to a plant which includes a servomechanism. One neural network is for receiving an input positioning signal and in accordance therewith providing an output positioning signal and a status signal. The input positioning signal includes information corresponding to a desired position of the servomechanism. The output positioning signal includes information corresponding to a positioning time period within which the servomechanism is to attain the desired position, while the status signal includes information corresponding to a control status of that neural network. Another neural network, coupled to the first neural network, is for receiving the status signal and a feedback signal and in accordance therewith providing a correction signal. The feedback signal includes information corresponding to a present position of the servomechanism and the correction signal corresponds to a deceleration time period within the positioning time period upon the termination of which the servomechanism attains the desired position.

These and other features and advantages of the present invention will be understood upon consideration of the following detailed description of the invention and the accompanying drawings.

BRIEF DESCRIPTION OF THE DRAWINGS

Throughout the figures, like elements are designated with like numerals.

DETAILED DESCRIPTION OF THE INVENTION

Figure 4:
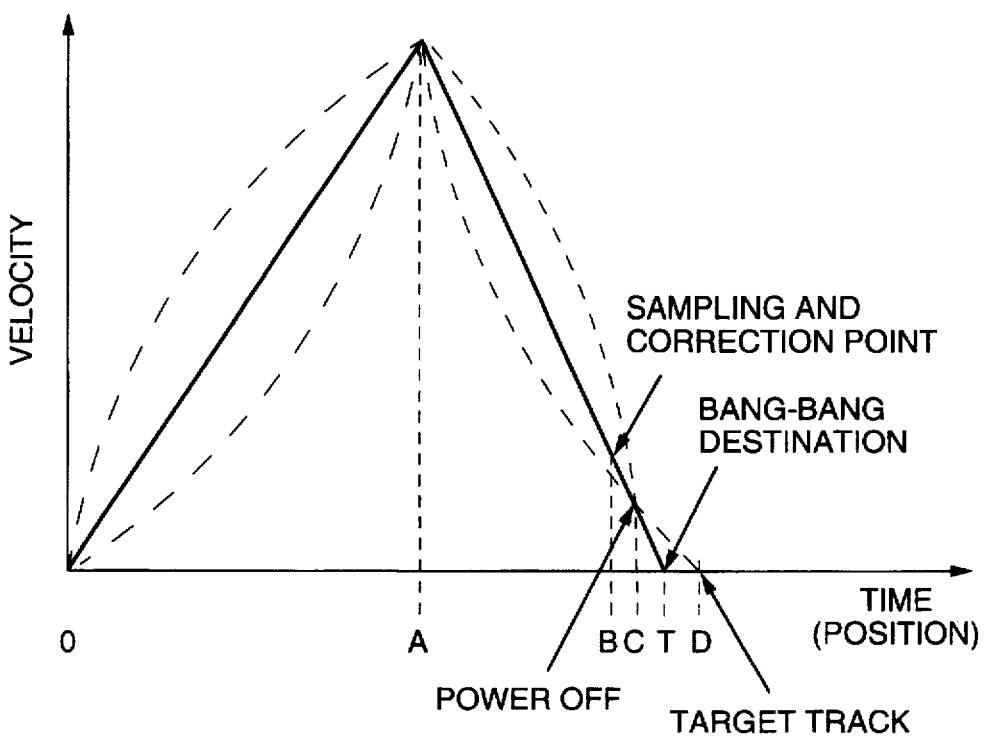
FIG. 4 illustrates an exemplary velocity profile for an improved "bang-bang" servomechanism drive technique in accordance with the present

Referring to FIG. 4, a servomechanism controller in accordance with the present invention generates a modified bang-bang drive signal for a plant with a single-point, single-ended correction. (As seen in FIG. 4, the lines representing the acceleration and deceleration slopes are depicted ideally, i.e. as straight lines; however, it should be understood that, as indicated by the dashed lines, the acceleration and deceleration slopes need not necessarily be precisely linear.) As discussed further below, one or more neural networks "learn" to generate such a modified bang-bang drive signal for a plant by being appropriately "trained". The neural network learns the bang-bang switching point A and provides a plant drive signal in accordance therewith. Based upon feedback information, the neural network learns a sampling and correction point B and, as necessary, provides appropriate correction for the plant drive signal (e.g. by turning off the power driving the servomechanism within the plant). Hence, the neural network outputs a plant drive signal which includes information corresponding to the bang-bang switching time (point A in FIG. 4) plus further information corresponding to a sampling and correction point (point B) and a bang-bang destination point (point T) so as to correct, or compensate, for the effects of parameter variations and operating conditions.

Figure 1:
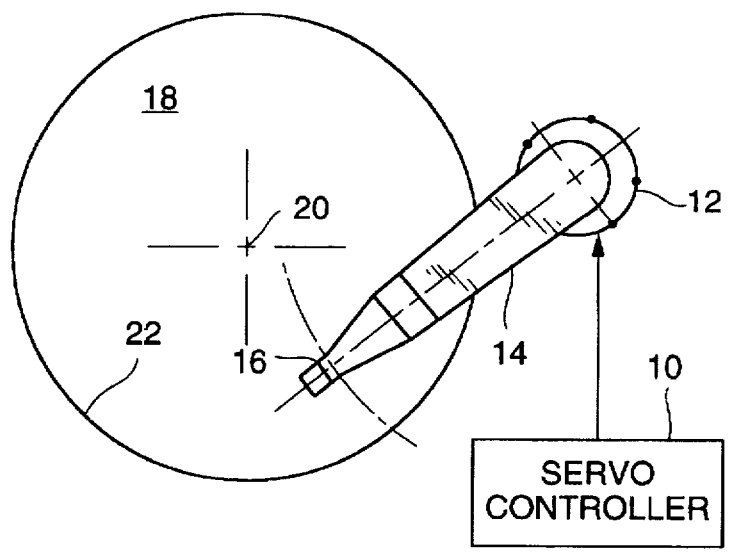
FIG. 1 illustrates a portion of a conventional disk drive assembly with an actuator servomechanism for positioning a magnetic transducer on the surface of a magnetic disk for the storage and retrieval of information thereon.
Figure 2:
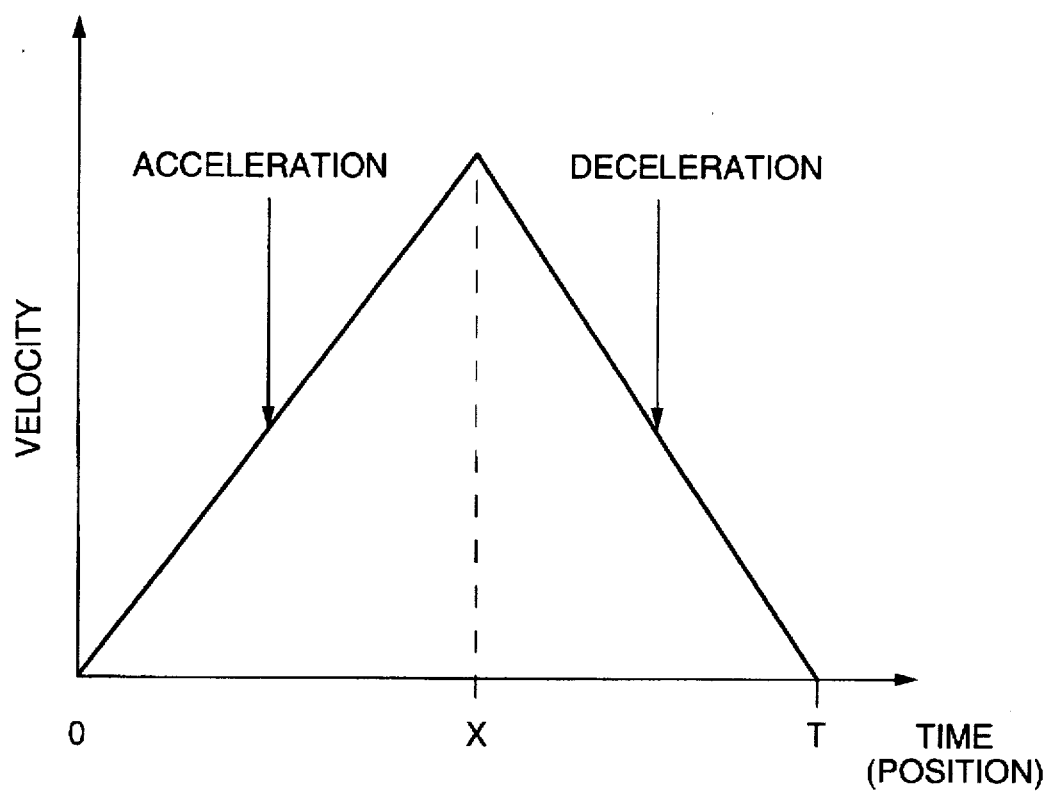
FIG. 2 illustrates an exemplary velocity profile for a conventional "bang-bang" servomechanism drive technique.
Figure 3:
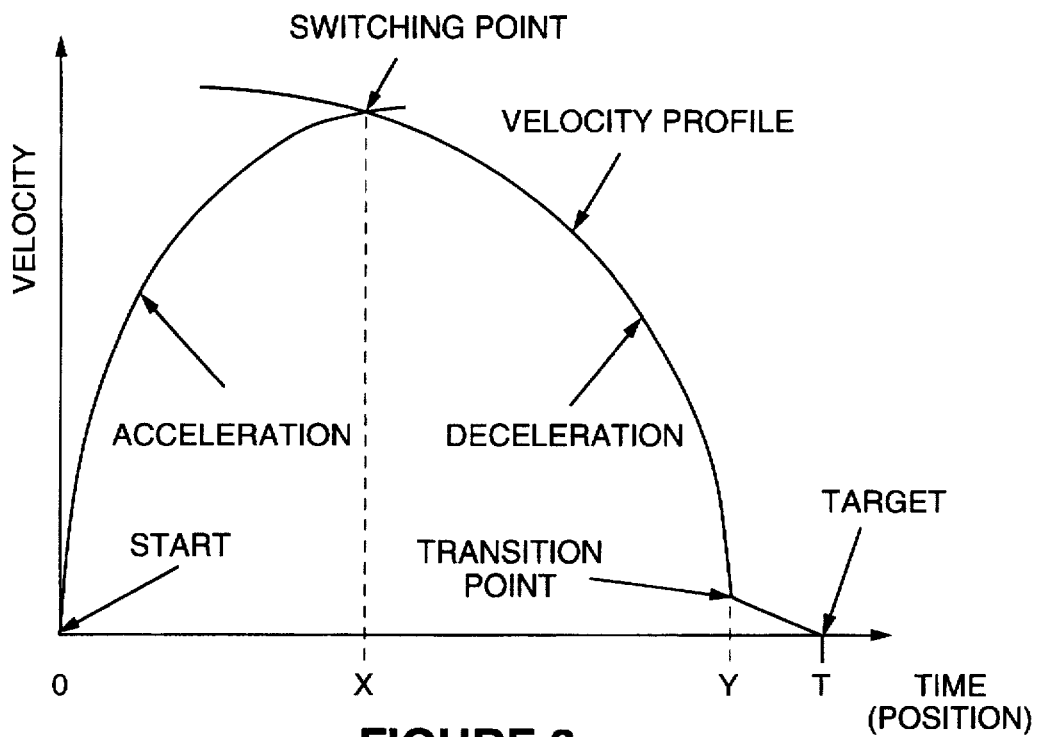
FIG. 3 illustrates an exemplary velocity profile for a conventional "velocity profile method" servomechanism drive technique.
Figure 5A:
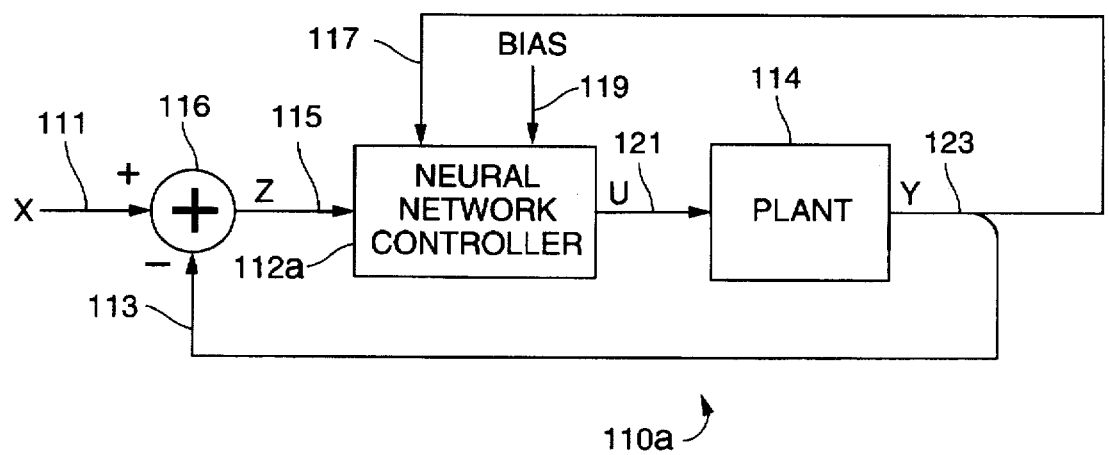
FIGS. 5A and 5B are functional block diagrams of a servomechanism assembly using a servomechanism controller with one neural network in accordance with one embodiment of the present invention.

Referring to FIG. 5A, a servomechanism assembly 110a using a servomechanism controller in accordance with one embodiment of the present invention includes a neural network controller 112a, a plant 114 and a signal combiner 116, connected substantially as shown. (The plant 114 can be a servomechanism, such as an actuator servomechanism assembly similar to that depicted in FIG. 1). The signal combiner 116 receives an input positioning signal X 111 and a feedback signal 113 from the plant 114. The input positioning signal 111 includes information representing a desired, or "target," position for the servomechanism within the plant 114 (e.g. a track address or actuator position with respect to the surface of a disk 18 (FIG. 1). The feedback signal 113 includes information from the plant 114 representing the present position (e.g. rotational position) of the servomechanism within the plant 114. These input signals 111, 113 are differentially combined by the signal combiner 116 to produce a positioning control signal Z 115 for the neural network controller 112a.

The neural network controller 112a receives this positioning control signal 115 and a feedback signal 117 from the plant 114. This feedback signal 117 includes information representing the present position (e.g. rotational position) of the servomechanism within the plant 114, its direction of movement (e.g. clockwise or counterclockwise) and other information, such as power supply voltage. The neural network controller 112a further receives a bias signal 119 (discussed further below). Based upon these input signals 115, 117, 119 and the information they represent, the neural network controller 112a provides a control signal U 121 for controlling the plant 114, i.e. controlling the positioning of the servomechanism within the plant 114.

The plant provides output signals Y 123 which include the feedback signals 113, 117 for the signal combiner 116 and neural network controller 112a, as discussed above.

Figure 5B:
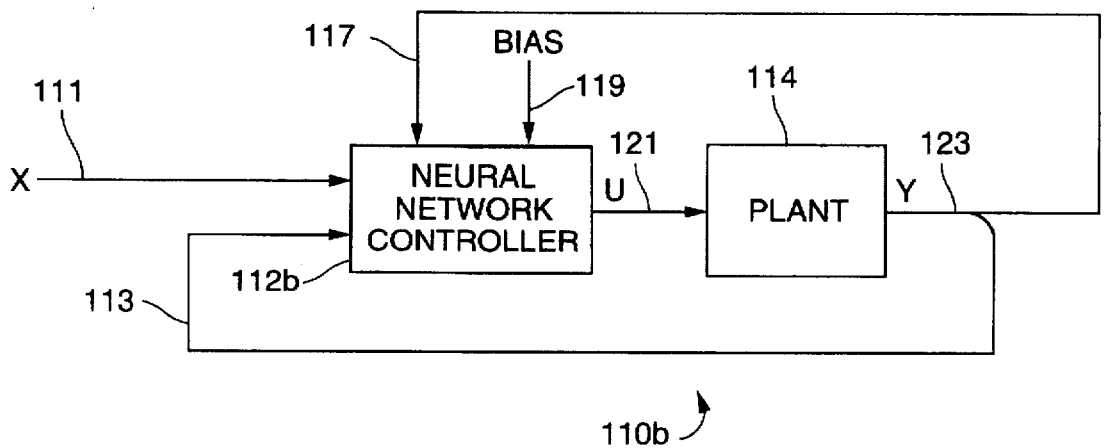

Referring to FIG. 5B, a servomechanism assembly 110b using a servomechanism controller in accordance with another embodiment of the present invention includes a neural network controller 112b and plant 114, connected substantially as shown. In this embodiment, the signal combiner 116 (FIG. 5A) is not used. Instead, the neural network controller 112b receives both the input positioning signal 111 and feedback signal 113 from the plant 114. Based upon these two input signals 111, 113, plus the other feedback signal 117 from the plant 114 (and bias signal 119), the neural network controller 112b provides the plant control signal 121.

Figure 6A:
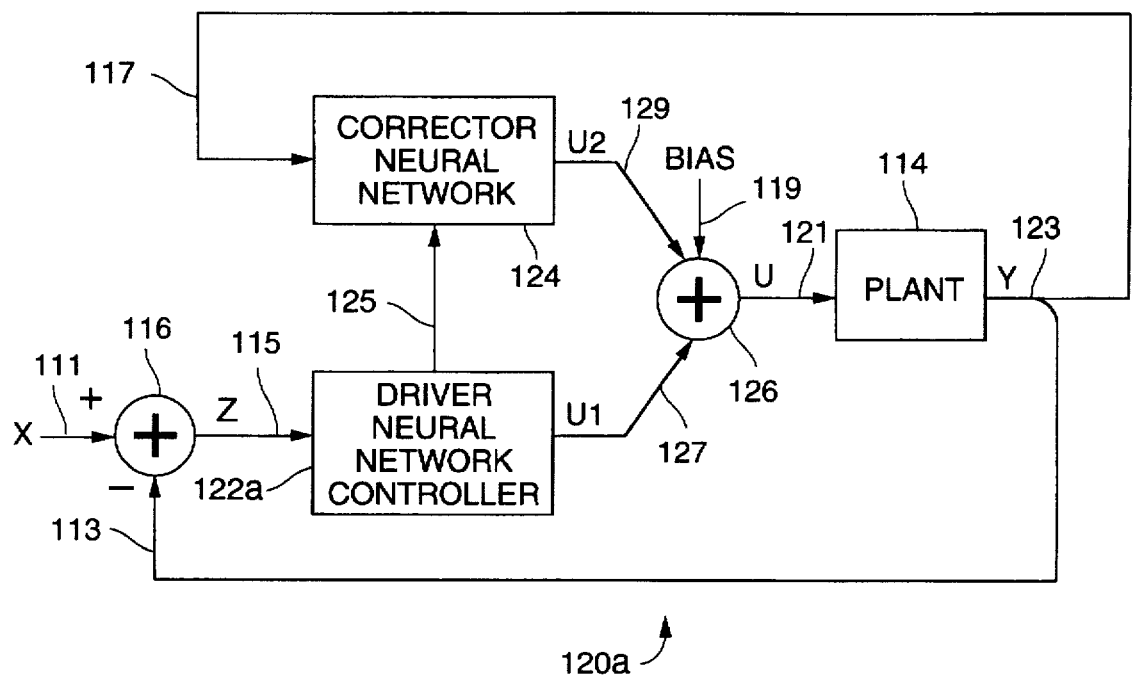
FIGS. 6A and 6B are functional block diagrams of a servomechanism assembly using a servomechanism controller with two neural networks in accordance with another embodiment of the present invention.

Referring to FIG. 6A, a servomechanism assembly 120a using a servomechanism controller in accordance with another embodiment of the present invention includes a neural network controller 122a, a neural network 124, a plant 114 and two signal combiners 116, 126, connected substantially as shown. As discussed above, an input positioning signal 111 and feedback signal 113 from the plant 114 are differentially combined by the signal combiner 116 to produce a positioning control signal Z 115. The neural network controller 122a, referred to as the "driver" neural network controller, in accordance with the input positioning signal 115, provides a status signal 125 and a positioning control signal U1 127. However, in this embodiment, the other feedback signal 117 from the plant 114 is received by the other neural network 124, referred to here as a "corrector" neural network. The corrector neural network 124 also receives the status signal 125 from the driver neural network controller 122a. This status signal informs the corrector neural network 124 as to the control status of the driver neural network controller 122a. (This control status information includes timing information about when the corrector neural network 124 should initiate correction, or compensation, for the plant control.) In accordance with these two input signals, 117, 125, the corrector neural network 124 provides a correction signal U2 129 (discussed further below).

The positioning control signal 127 and correction signal 129 are combined in a signal combiner 126, along with the bias signal 119, to produce the plant control signal 121.

Figure 6B:
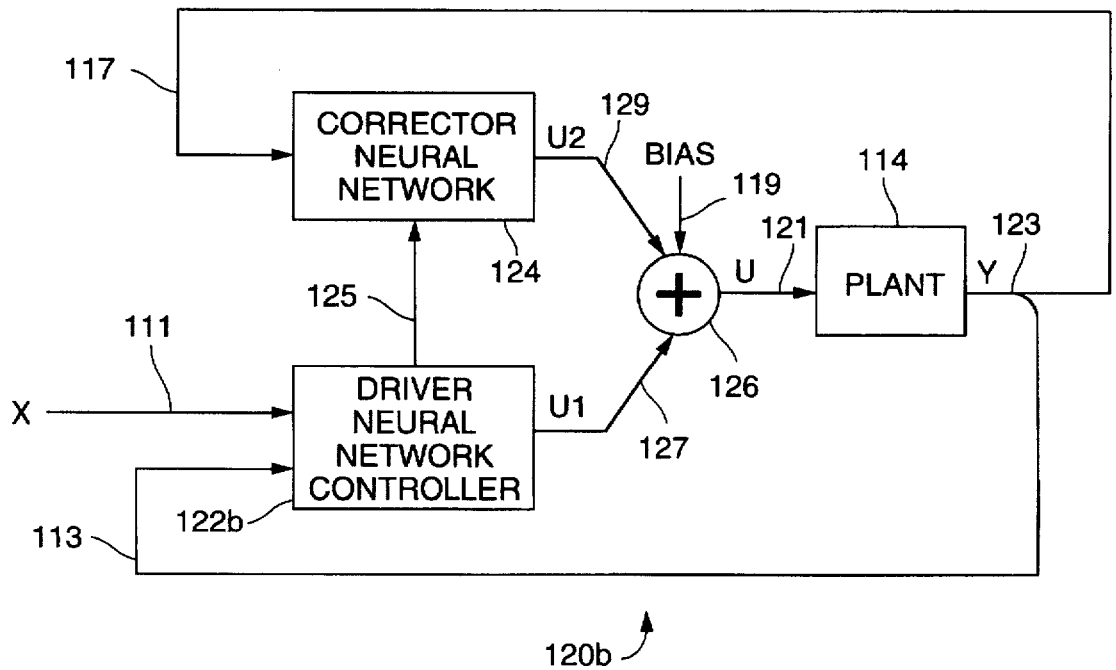

Referring to FIG. 6B, a servomechanism assembly 120b using a servomechanism controller in accordance with another embodiment of the present invention includes a neural network controller 122b, a neural network 124, a signal combiner 126 and a plant 114, connected substantially as shown. This servomechanism assembly 120b operates in a manner similar to that of the assembly 120a in FIG. 5A. However, no input signal combiner 116 (FIG. 6A) is used. Instead, the driver neural network controller 122b receives both the input positioning signal 111 and first feedback signal 113 from the plant 114. Based upon these input signals 111, 113, the driver neural network controller 122b provides the status signal 125 and positioning control signal 127, as discussed above.

Figure 7A:
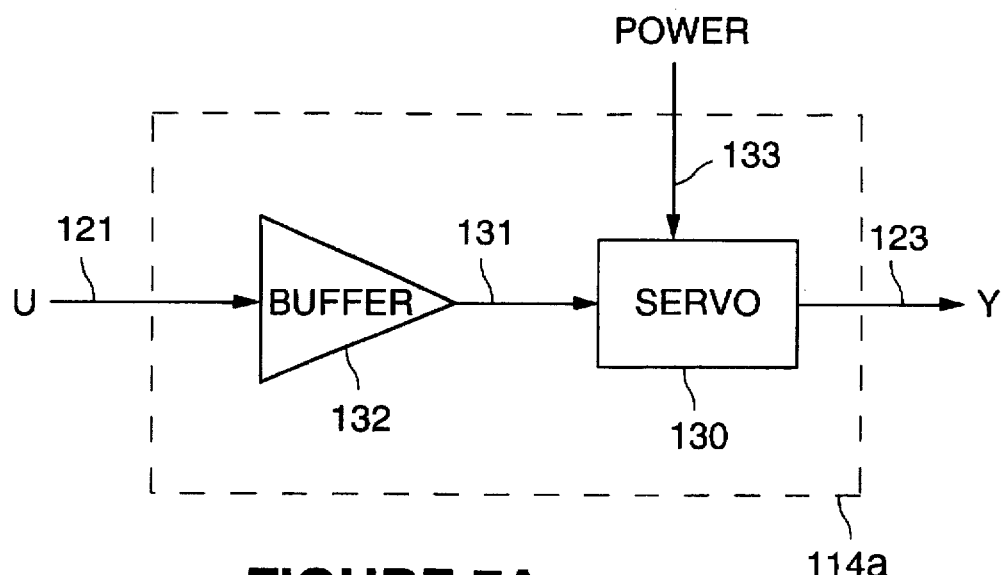
FIGS. 7A and 7B are functional block diagrams of exemplary plants with servomechanisms suitable for being controlled with servomechanism controllers in accordance with the present invention.
Figure 7B:
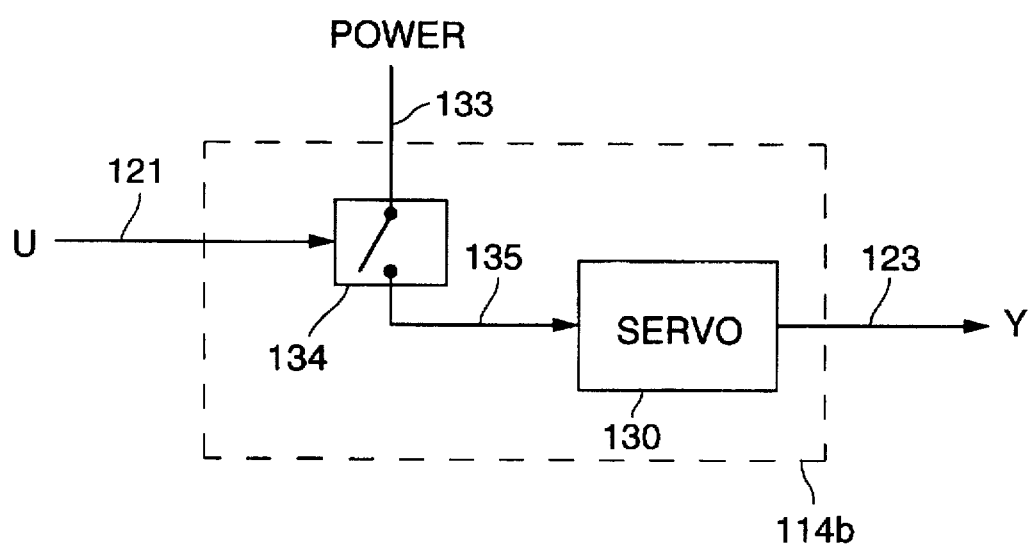

Referring to FIGS. 7A and 7B, two possible plant embodiments 114a and 114b, respectively, are illustrated. One embodiment 114a (FIG. 7A) includes a servomechanism 130 which is powered by a power signal 133 and controlled by a servomechanism control signal 131. In accordance with the foregoing discussion, this plant 114a receives the plant control signal 121 and buffers it with a buffer amplifier 132. The buffered output 131 serves as the servomechanism control signal 131.

In another plant embodiment 114b (FIG. 7B), the servomechanism 130 receives a switched power signal 135. The plant control signal 121 controls a switch 134 which provides the switched power signal 135 to the servomechanism 130. As discussed further below, in accordance with the plant control signal 121, power is applied to the servomechanism 130 and then removed as the servomechanism attains its target position.

In accordance with the foregoing, other suitable plant embodiments 114 will become evident to those of ordinary skill in the art. For example, features of the plant embodiments 114a and 114b of FIGS. 7A and 7B, respectively, can be combined to provide a plant in which the servomechanism 130 is controlled through a combination of both a switched power signal 135 and a buffered drive, or control, signal 131.

Various types of neural networks which are well known in the art can be used to form the above-discussed neural network controllers 112a, 112b, 122a, 122b and neural network 124. Additionally, further examples of suitable neural network-based controllers and their operating characteristics can be found in U.S. Pat. No. 5,448,681, issued Sep. 5, 1995, and entitled "Intelligent Controller With Neural Network and Reinforcement Learning", and also in U.S. Pat. No. 5,471,381,issued Nov. 28, 1995, and entitled "Intelligent Servomechanism Controller". The disclosures of these patent applications are incorporated herein by reference.

Figure 8A:
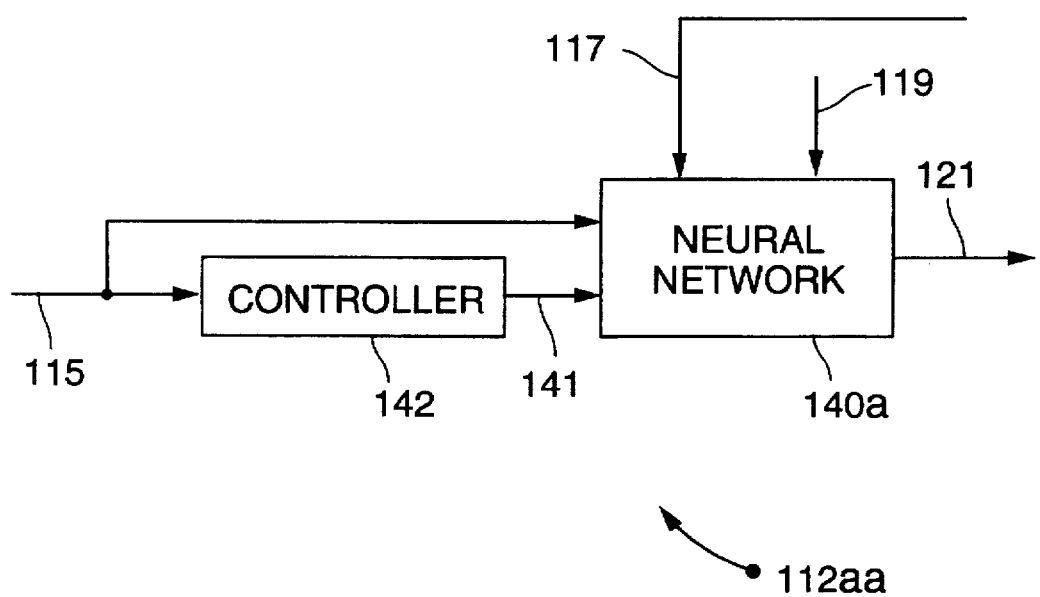
FIGS. 8A and 8B are functional block diagrams of exemplary controllers suitable for use as the neural network controllers of FIGS. 5A and 5B, respectively.
Figure 8B:
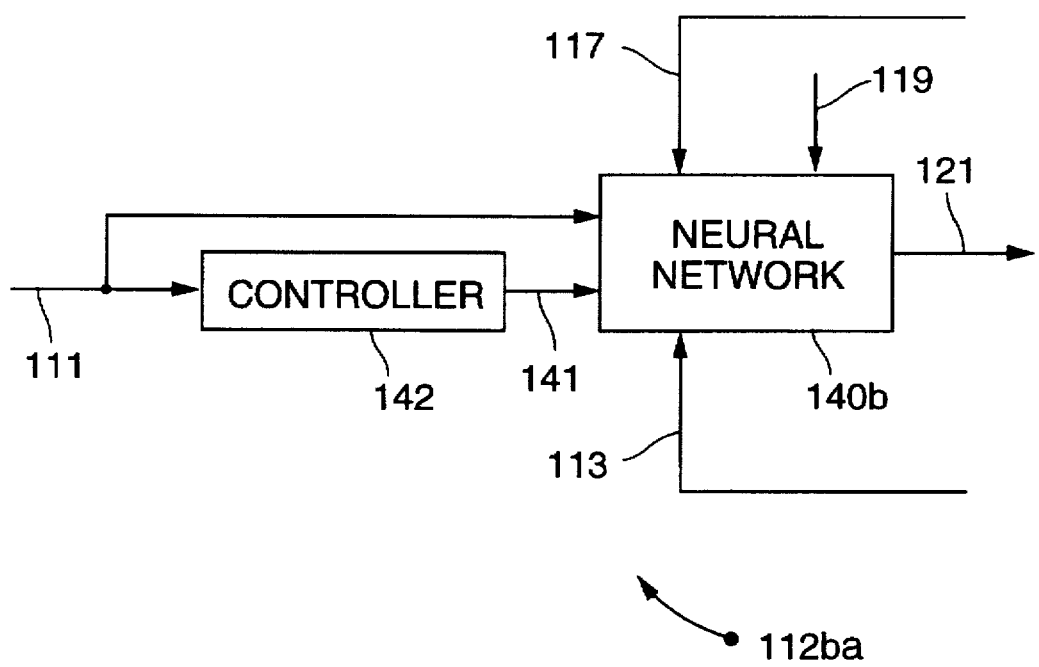

The above-discussed neural network controllers 112a, 112b, 122a, 122b can consist of a neural network alone or, alternatively, can include a neural network with a "dumb" controller (e.g. a non-programmable controller or a controller with a fixed program). For example, referring to FIG. 8A, one embodiment 112aa of the neural network controller 112a of FIG. 5A can include a neural network 140a with a dumb controller 142, connected substantially as shown. The dumb controller 142 receives the positioning control signal 115 and produces a dumb control signal 141 which is received, along with the positioning control signal 115, feedback signal 117 and bias signal 119, by the neural network 140a for use in generating the plant control signal 121. Referring to FIG. 8B, one embodiment 112ba of the neural network controller 112b of FIG. 5B can include a neural network 140b with a dumb controller 142, connected substantially as shown. The dumb controller 142 receives the input positioning signal 111 and produces a dumb control signal 141 which is received, along with the input positioning signal 115, first feedback signal 117, bias signal 119 and second feedback signal 113, by the neural network 140b for use in generating the plant control signal 121.

Figure 9A:
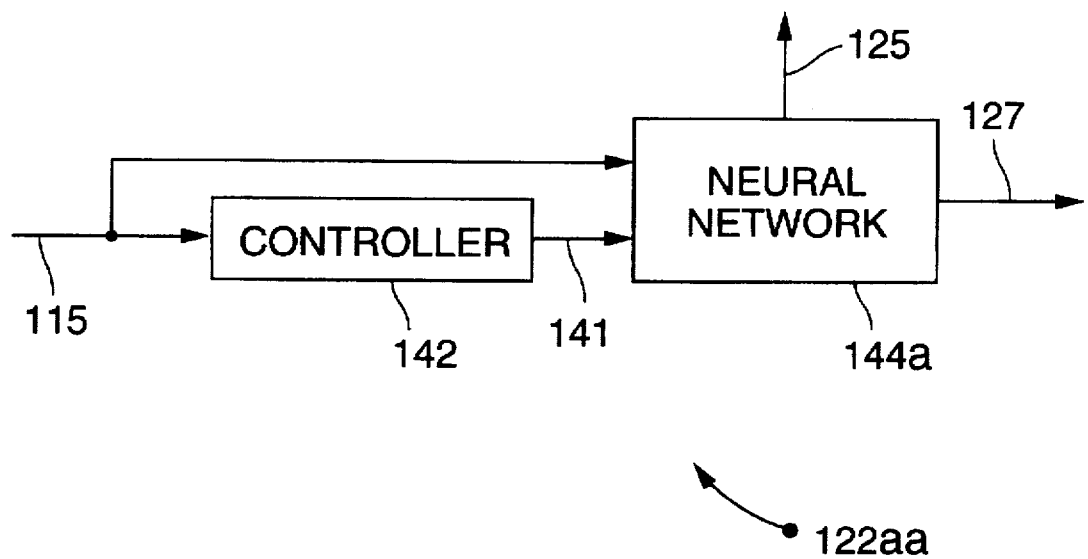
FIGS. 9A and 9B are functional block diagrams of exemplary controllers suitable for use as the neural network controllers of FIGS. 6A and 6B, respectively.
Figure 9B:
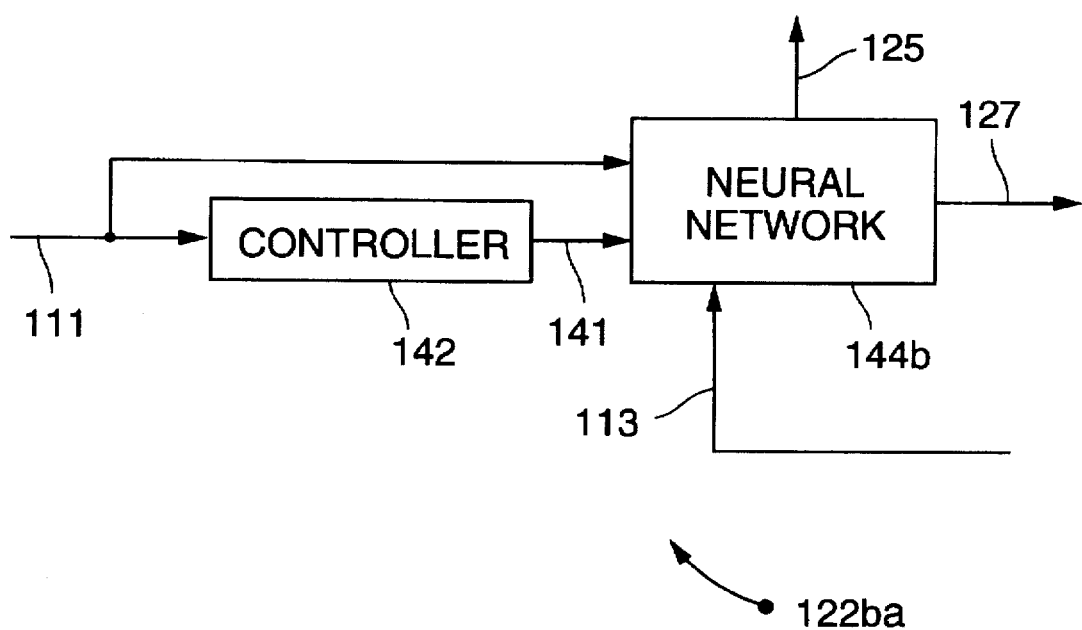

Similarly, referring to FIG. 9A, one embodiment 122aa of the neural network controller 122a of FIG. 6A can include a neural network 144a with a dumb controller 142, connected substantially as shown. The dumb controller 142 receives the positioning control signal 115 and produces a dumb control signal 141 which is received by the neural network 144a for use in generating the status signal 125 and positioning control signal 127. Referring to FIG. 9B, one embodiment 122ba of the neural network controller 122b of FIG. 6B can include a neural network 144b with a dumb controller 142, connected substantially as shown. The dumb controller 142 receives the input positioning signal 11 1 and produces a dumb control signal 141 which is received, along with the feedback signal 113, by the neural network 144b for use in generating the status signal 125 and positioning control signal 127. (Further discussion of these types of neural network-based controllers can be found in the aforementioned U.S. Pat. No. 5,471,381.)

Referring back to FIG. 4, the neural network controller 112a/112b (FIGS. 5A/5B), or neural network controllers 122a 122b and neural network 124 (FIGS. 6A/6B), generate a modified bang-bang drive signal for the plant 114 with a singlepoint, single-ended correction. (As seen in FIG. 4, the lines representing the acceleration and deceleration slopes are depicted ideally, i.e. as straight lines; however, it should be understood that, as indicated by the dashed lines, the acceleration and deceleration slopes need not necessarily be linear.) The neural network controllers 112a/112b/122a/122b and neural network 124 "learn" to generate such a modified bang-bang drive signal for the plant 114 by being appropriately "trained". Such training of the neural networks can be effected according to any of a number of well known, conventional techniques, or alternatively, according to those techniques taught in the aforementioned U.S. Pat. No. 5,471,381.

For the single neural network systems 110a and 110b of FIGS. 5A and 5B, respectively, the neural network controller 112a/112b learns the bang-bang switching point A and provides the plant drive signal 121 in accordance therewith. Also, based upon the feedback signal 117, the neural network controller 112a/112b learns a sampling and correction point B and, as necessary, the plant drive signal 121 (e.g. by the plant drive signal 121 (e.g. by turning off the power 133 driving the servomechanism 130 within the plant 114 (FIG. 7B). Hence, the neural network controller 112a/112b outputs a plant drive signal 121 which includes information corresponding to the bang-bang switching time (point A in FIG. 4) plus further information corresponding to a sampling and correction point (point B) and a bang-bang destination point (point T) so as to correct, or compensate, for the effects of parameter variations and operating conditions.

The neural network controller 112a/112b is trained with bang-bang seek data covering the complete range of radial (for an actuator) or rotational (for servomechanism) distances for the starting (present) and ending (desired or target) positions, in both directions and under various operating conditions. The neural network controller 112a/112b is then trained further with data obtained by measuring positions of the servomechanism 130 at the vicinity of the sampling point(s) for correction, and finding the distance traveled for various power cut-off durations under various operating conditions. Sufficient training data should be used to cover the velocity and deceleration ranges likely to be encountered by the servomechanism 130 over the full range of movement (e.g. the full radial range of actuator 14 movement over the surface of a disk 18 (FIG. 1).

For the dual neural network systems 120a and 120b of FIGS. 6A and 6B, respectively, the driver neural network controller 122a/122b learns the bang-bang switching point A and provides its drive signal 127 in accordance therewith. Similarly, the corrector neural network 124, based upon the feedback signal 117, learns a sampling and correction point B, and provides its correction signal 129 (e.g. for turning off the power 33 driving the servomechanism 130 (FIG. 7B). Hence, the driver neural network controller 122a/122b outputs a drive signal 127 which represents the bang-bang switching time (point A in FIG. 4), and the corrector neural network 124 outputs a correction signal 129 which corrects (points B and C) for the effects of parameter variations and operating conditions.

The driver neural network controller 122a/122b is trained with bang-bang seek data covering the complete range of radial (for an actuator) or rotational (for servomechanism) distances for the starting (present) and ending (desired or target) positions, in both directions and under various operating conditions. The corrector neural network 124 is trained with data obtained by measuring positions of the servomechanism 130 at the vicinity of the sampling point for correction, and finding the distance traveled for various power cut-off durations under various operating conditions. Sufficient training data should be used to cover the velocity and deceleration ranges likely to be encountered by the servomechanism 130 over the full range of movement (e.g. the full radial range of actuator 14 movement over the surface of a disk 18 (FIG. 1).

When the positioning of the servomechanism 130 (e.g. actuator) is to be changed (e.g. when a data seek is to initiated), the switching time for traveling the required distance (e.g. radial disk distance) is determined (e.g. based upon the learning of the neural network controller 112a/112b/122a/122b). A negative bias signal 119 is applied to ensure that the error, i.e. the difference between the desired and actual resulting position, is at least slightly positive. The plant drive signal 121 causes the servomechanism 130 (FIGS. 7A/7B) to accelerate from its present, or originating, position (origin O) and then, at a bang-bang switching point A, to decelerate toward the bang-bang destination point T (FIG. 4). At the sampling and correction point B, the present position of the servomechanism 130, as indicated by the feedback signal 117 (which includes information representing the servomechanism 130 position, distance (e.g. number of disk tracks) left to go, direction of movement and power supply voltage), is sampled by the responsible neural network (the neural network controller 112a/112b in the single neural network system 110a/110b (FIGS. 5A and 5B) or the corrector neural network 124 (FIGS. 6A and 6B).

In the single neural network implementation, the neural network controller 112a/112b corrects the plant control signal 121. In the dual neural network implantation, the corrector neural network 124 provides the correction signal 129 which is combined with the driver signal 127 (and bias signal 119) to correct the plant control signal 121. The corrected plant control signal instructs the servomechanism 130 to terminate its movement (e.g. by terminating the application of the power driving it). This termination of servomechanism 130 drive power occurs at point C. Following termination of its drive power, the servomechanism 112 will decelerate and come to rest at the desired, or target, position D (e.g. desired disk track).

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A servomechanism controller for controlling the movement and positioning of a servomechanism using a modified bang-bang seek technique, said servomechanism controller comprising:

a first neural network for coupling to a plant which includes a servomechanism and for receiving a first input positioning signal and in accordance therewith providing an output positioning signal and a status signal, wherein said first input positioning signal includes information corresponding to a desired position of said servomechanism, said output positioning signal includes information corresponding to a positioning time period within which said servomechanism is to attain said desired position, and said status signal includes information corresponding to a control status of said first neural network; and a second neural network, coupled to said first neural network, for coupling to said plant and for receiving said status signal and a second input positioning signal and in accordance therewith providing a correction signal, wherein said second input positioning signal includes information corresponding to a present position of said servomechanism and said correction signal corresponds to a deceleration time period within said positioning time period upon the termination of which said servomechanism attains said desired position.

2. A servomechanism controller as recited in claim 1, wherein said first input positioning signal further includes information corresponding to said present position of said servomechanism.

3. A servomechanism controller as recited in claim 1, wherein said output position signal further includes information corresponding to acceleration and deceleration profiles of said servomechanism during its movement from said present position to said desired position.

4. A servomechanism controller for controlling the movement and positioning of a servomechanism using a modified bang-bang seek technique, said servomechanism controller comprising:

a first neural network for coupling to a plant which includes a servomechanism and for receiving a first input positioning signal and in accordance therewith providing an output positioning signal and a status signal, wherein said first input positioning signal includes information corresponding to a desired position of said servomechanism, said output positioning signal includes information corresponding to a positioning time period during which a power signal is applied to effect movement of said servomechanism from a present position to said desired position, and said status signal includes information corresponding to a control status of said first neural network; and a second neural network, coupled to said first neural network, for coupling to said plant and for receiving said status signal and a second input positioning signal and in accordance therewith providing a correction signal, wherein said second input positioning signal includes information corresponding to said present position of said servomechanism and said correction signal corresponds to a time point within said positioning time period at which said power signal application is terminated.

5. A servomechanism controller as recited in claim 4, wherein said first input positioning signal further includes information corresponding to said present position of said servomechanism.

6. A servomechanism controller as recited in claim 4, wherein said output positioning signal further includes information corresponding to acceleration and deceleration profiles of said servomechanism during its movement from said present position to said desired position.

7. A servomechanism controller as recited in claim 4, wherein said second neural network generates said correction signal by determining a deceleration time period within said positioning time period upon the termination of which said servomechanism attains said desired position.

8. A control method for controlling the movement and positioning of a servomechanism using a modified bang-bang seek technique, said control method comprising the steps of:

receiving a first input positioning signal which includes information corresponding to a desired position of a servomechanism;

providing an output positioning signal in accordance with said first input positioning signal to a plant which includes said servomechanism, wherein said output positioning signal includes information corresponding to a positioning time period within which said servomechanism is to attain said desired position;

providing a status signal in accordance with said first input positioning signal, wherein said status signal includes information corresponding to a control status of said positioning of said servomechanism;

receiving a second input positioning signal which includes information corresponding to a present position of said servomechanism; and providing a correction signal in accordance with said status signal and said second input positioning signal, wherein said correction signal corresponds to a deceleration time period within said positioning time period upon the termination of which said servomechanism attains said desired position.

9. A control method as recited in claim 8, wherein said first input positioning signal further includes information corresponding to said present position of said servomechanism.

10. A control method as recited in claim 8, wherein said output positioning signal further includes information corresponding to acceleration and deceleration profiles of said servomechanism during its movement from said present position to said desired position.

11. A control method for controlling the movement and positioning of a servomechanism using a modified bang-bang seek technique, said control method comprising the steps of:

receiving a first input positioning signal which includes information corresponding to a desired position of a servomechanism;

providing an output positioning signal in accordance with said first input positioning signal to a plant which includes said servomechanism, wherein said output positioning signal includes information corresponding to a positioning time period within which said servomechanism is to attain said desired position;

providing a status signal in accordance with said first input positioning signal, wherein said status signal includes information corresponding to a control status of said positioning of said servomechanism;

receiving a second input positioning signal which includes information corresponding to a present position of said servomechanism; and providing a correction signal in accordance with said status signal and said second input positioning signal, wherein said correction signal corresponds to a time point within said positioning time period at which a power signal application is terminated.

12. A control method as recited in claim 11, wherein said first input positioning signal further includes information corresponding to said present position of said servomechanism.

13. A control method as recited in claim 11, wherein said output positioning signal further includes information corresponding to acceleration and deceleration profiles of said servomechanism during its movement from said present position to said desired position.

14. A control method as recited in claim 11, wherein said step of providing a correction signal in accordance with said status signal and said second input positioning signal comprises determining a deceleration time period within said positioning time period upon the termination of which said servomechanism attains said desired position.

* * * * *